US009623561B2

(12) United States Patent
Stephens, Jr.

(10) Patent No.: US 9,623,561 B2
(45) Date of Patent: Apr. 18, 2017

(54) REAL TIME APPROXIMATION FOR ROBOTIC SPACE EXPLORATION

(71) Applicant: Kenneth Dean Stephens, Jr., Sunnyvale, CA (US)

(72) Inventor: Kenneth Dean Stephens, Jr., Sunnyvale, CA (US)

( * ) Notice: Subject to any disclaimer, the term of this patent is extended or adjusted under 35 U.S.C. 154(b) by 119 days.

(21) Appl. No.: 13/970,910

(22) Filed: Aug. 20, 2013

(65) Prior Publication Data
US 2015/0057801 A1 Feb. 26, 2015

Related U.S. Application Data

(60) Provisional application No. 61/711,750, filed on Oct. 10, 2012.

(51) Int. Cl.
*B25J 9/16* (2006.01)

(52) U.S. Cl.
CPC ... *B25J 9/1689* (2013.01); *G05B 2219/40116* (2013.01); *G05B 2219/40191* (2013.01); *Y10S 901/01* (2013.01); *Y10S 901/47* (2013.01)

(58) Field of Classification Search
CPC ........... G05B 2219/34406; G05B 2219/40147; G05B 2219/40151
See application file for complete search history.

(56) References Cited

U.S. PATENT DOCUMENTS

| 7,643,064 | B1 * | 1/2010 | Jouppi ...................... 348/211.9 |
| 7,761,173 | B2 * | 7/2010 | Ehrlich ........................... 700/83 |
| 8,774,950 | B2 * | 7/2014 | Kelly et al. .................... 700/65 |
| 8,947,522 | B1 * | 2/2015 | Hickman et al. ............ 348/114 |
| 2007/0126867 | A1 * | 6/2007 | McCutchen ................... 348/143 |
| 2010/0100256 | A1 * | 4/2010 | Jurmain et al. .................... 701/2 |
| 2010/0241289 | A1 * | 9/2010 | Sandberg .......................... 701/2 |
| 2011/0087371 | A1 * | 4/2011 | Sandberg et al. ............ 700/245 |
| 2014/0324249 | A1 * | 10/2014 | Lacaze et al. ..................... 701/2 |

FOREIGN PATENT DOCUMENTS

WO    WO 2009091536 A1 *  7/2009   ............... G05D 1/00

\* cited by examiner

*Primary Examiner* — Khoi Tran
*Assistant Examiner* — Ryan Rink

(57) ABSTRACT

A system and method for guidance of a moving robotic device through an approximated real time (ART) virtual video stream is presented. The system and method includes at least one camera for collecting images of a terrain in a remote location, at least one terrain data collecting device for collecting data from a remote location, a memory for storing images from the plurality of cameras, a communication device for transmitting the images and data over a path and a computer configured to calculate a delay between the cameras and the receiver. The calculated delay causes the computer to retrieve images and data from the receiver and memory and consequently generate an approximate real-time video and data stream for displaying the terrain-just-ahead of a moving robotic device at a distance proportional to the calculated delay and the ART video and data stream is used to guide the moving robotic device.

21 Claims, 6 Drawing Sheets

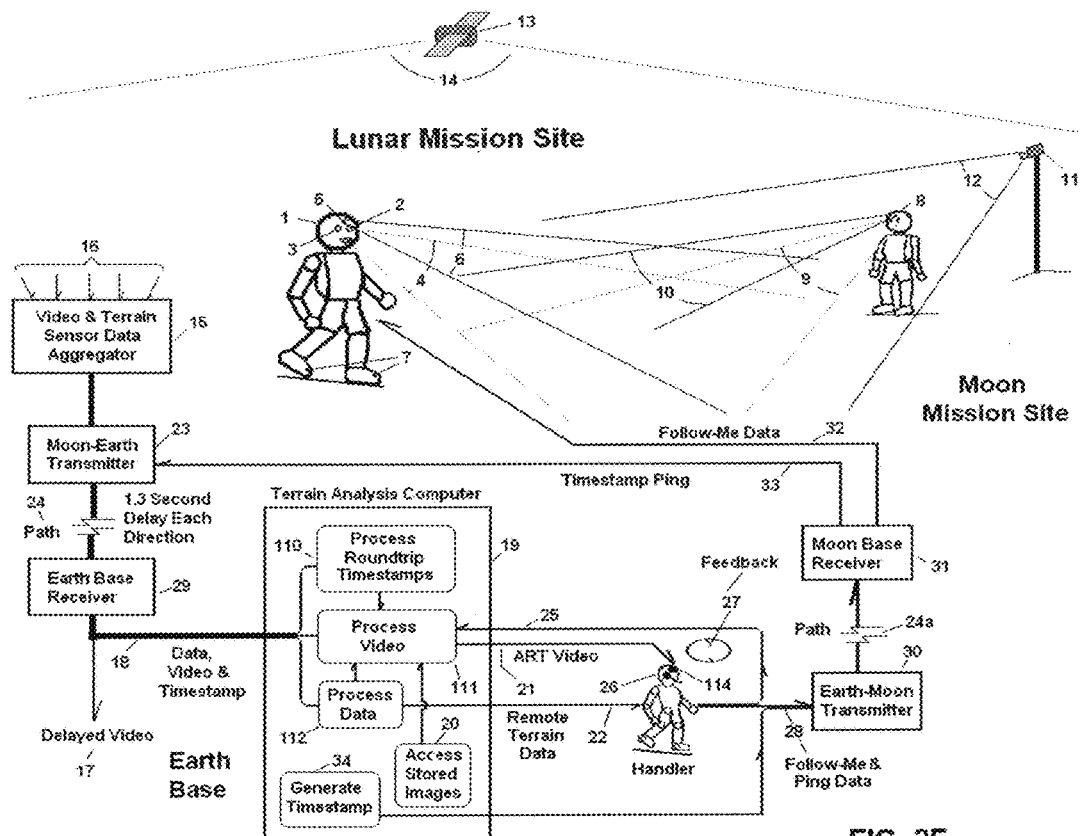
FIG. 1: Real Time Approximation for Short Communication Delay Missions
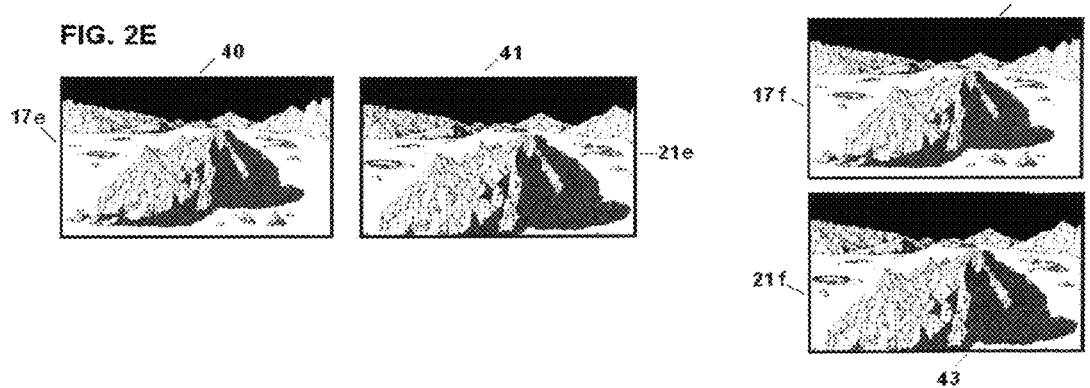
FIG. 2E
FIG. 2F

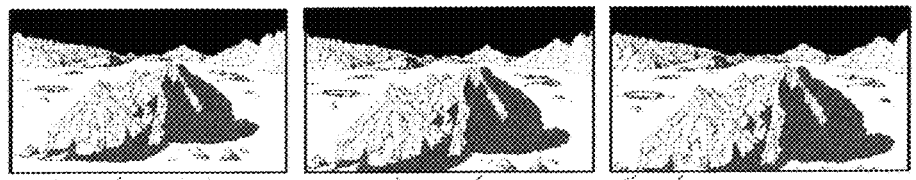
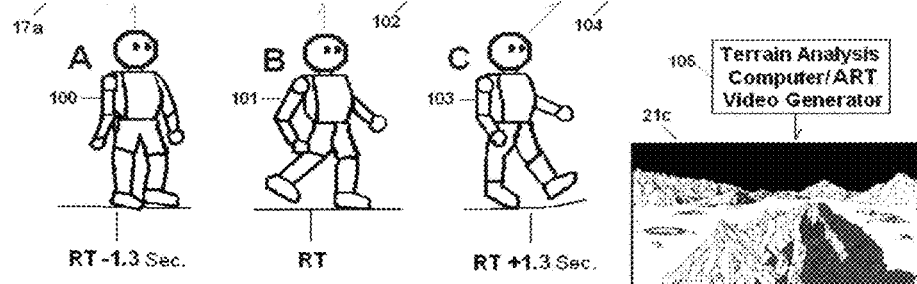
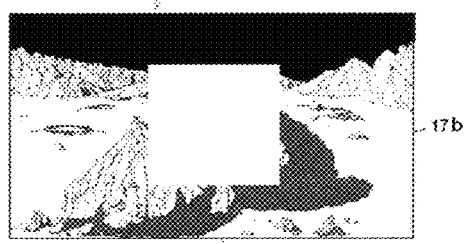
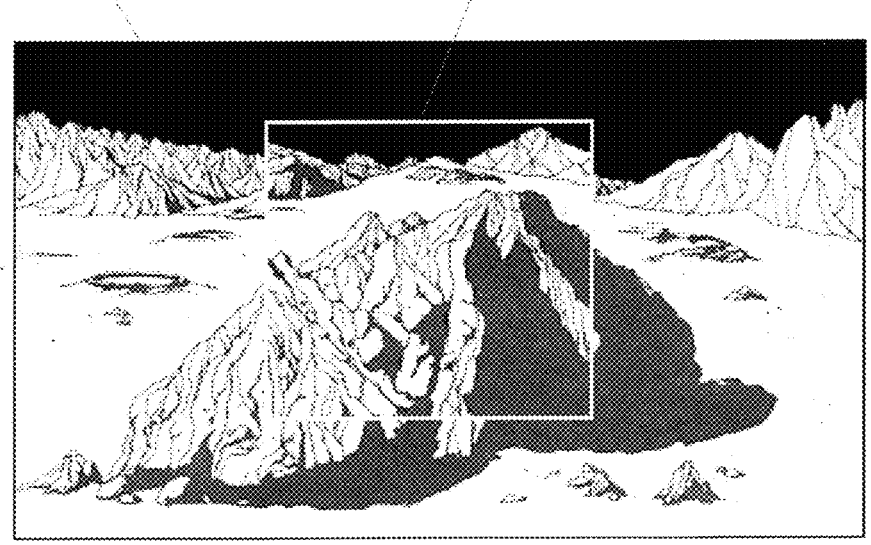

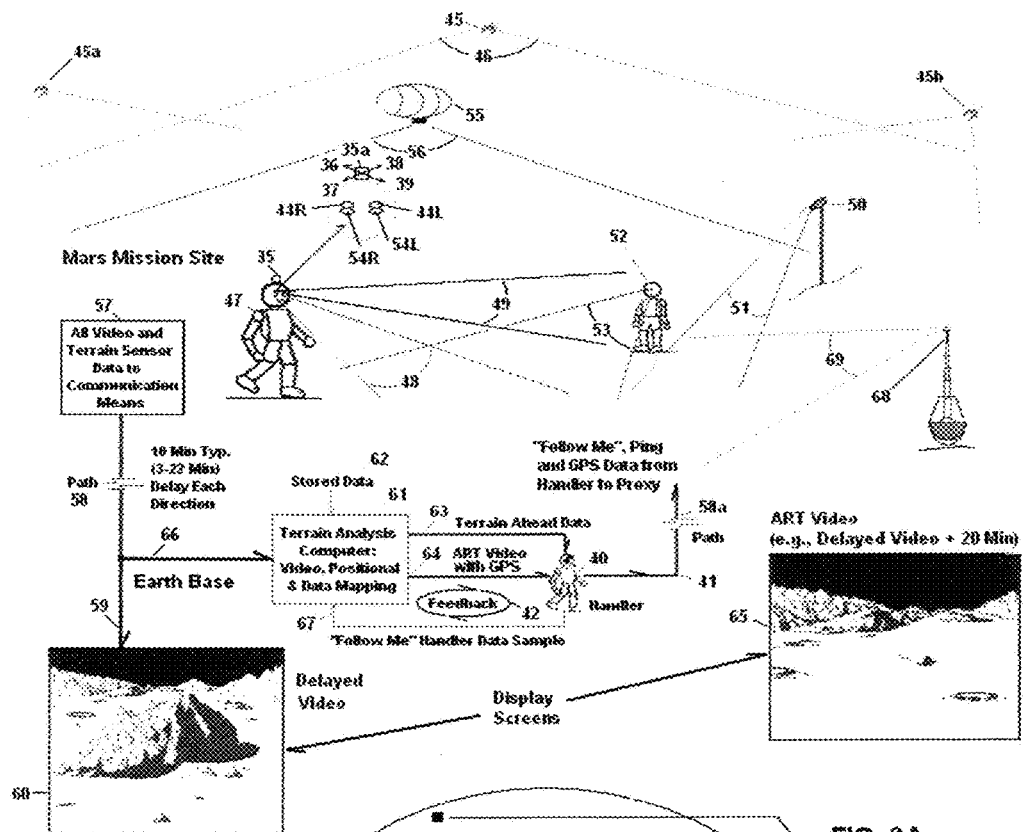
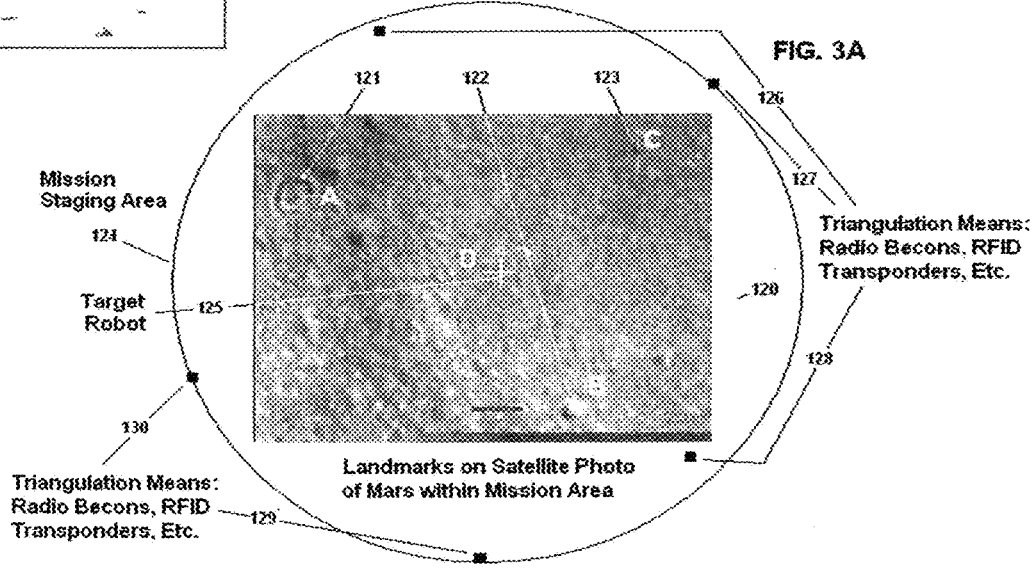

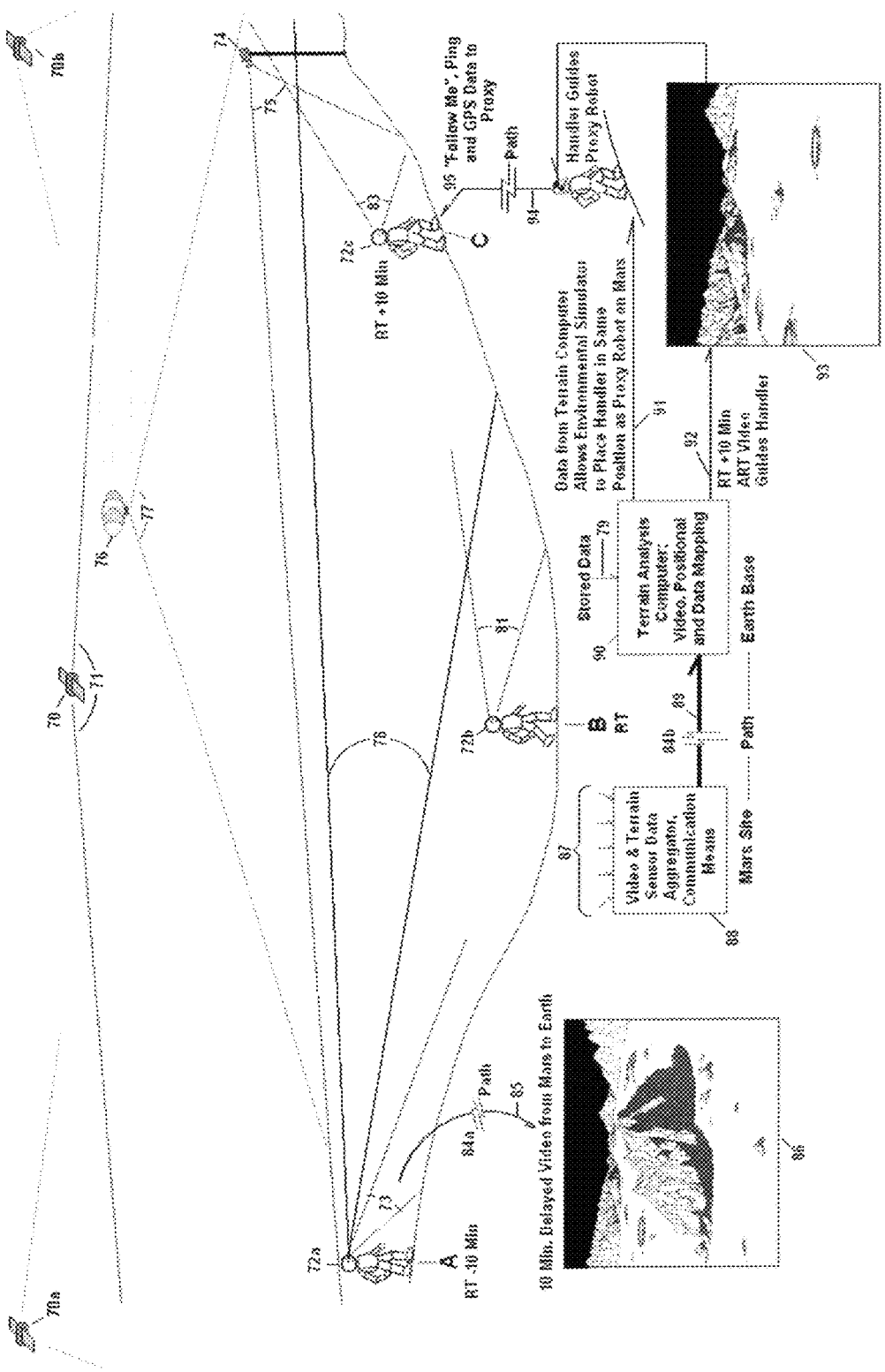

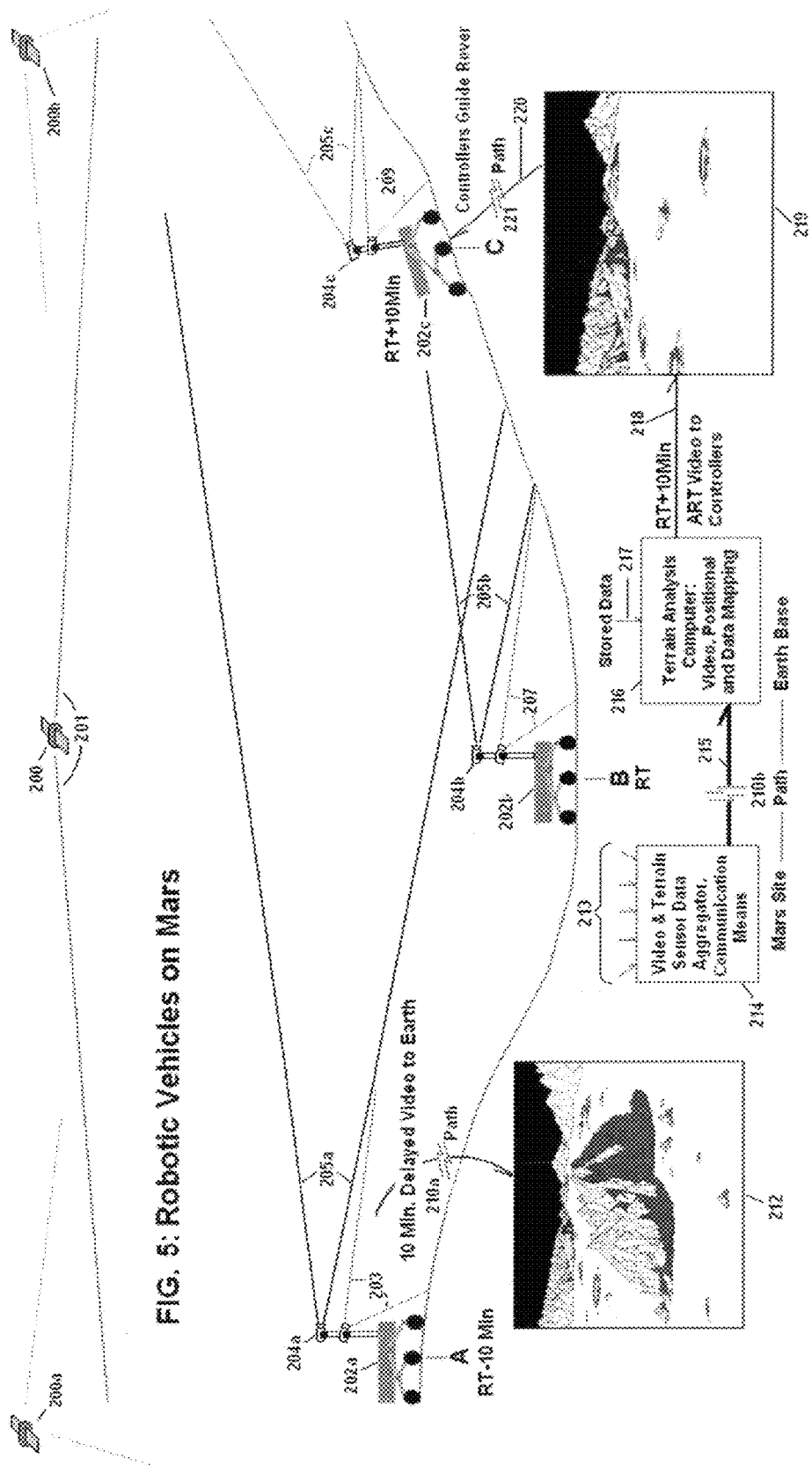

REAL TIME APPROXIMATION FOR ROBOTIC SPACE EXPLORATION

CLAIM OF PRIORITY

The present invention claims priority to Provisional U.S. Application No. 61/711,750 filed on Oct. 10, 2012; entitled "Real Time Approximation for Robotic Space Exploration."

FIELD OF THE INVENTION

The present claimed invention combines the fields of robotics with video and data mapping to create video approximation, as related to human proxy robot systems specifically and more generally to robotic communication and control.

BACKGROUND OF THE INVENTION

By its very nature, space exploration involves delays in communication between bases on Earth and missions in remote locations such as the Moon and planets. In the case of the Moon, there is a 1.3 second communication delay in each direction from and to the Earth, or 2.6 seconds round trip. In the case of proxy robotics (above), wherein a human handler guides a proxy robot by "seeing" through that robot's "eyes," the 2.6 second round trip delay between a "follow me" movement and its visual confirmation can result in dizziness, nausea and disorientation in the human handler.

Planetary exploration generates a far longer delay: between 3 and 22 minutes each way between Earth and Mars, for example, generally resulting in agonizingly slow progress for robotic vehicle missions as Mission Control issues a command and then waits 10 or 20 minutes for video confirmation that it has been successfully carried out.

The invention of the present patent application overcomes such video delay problems by computer-generating a video stream approximating as nearly as possible what the remote robot will see at the exact time when a handler's "follow me" movement or robotic controller's joystick command reaches it. In the case of a proxy robot on the Moon under the control of a human handler on Earth, the approximated video displayed to the handler will be 1.3 seconds in the proxy robot's future, the time the proxy will receive the handler's instructions.

With a communication delay measured in minutes rather than seconds, a robotic mission to Mars presents a bigger challenge when it comes to approximating times like 5, 10 or 15 minutes in the robot's future. To generate such an accurate video representation requires detailed video and positional mapping of the entire mission site, and constant updating and refining of the approximated video stream.

The references and descriptions of human proxy robotics are further described in U.S. patent application Ser. No. 13/479,128, "Space Exploration with Human Proxy Robots", filed May 23, 2012 and U.S. patent application Ser. No. 13/593,518, "Proxy Robots and Remote Environment Simulator for their Human Handlers", filed Aug. 24, 2012 which are herein incorporated by reference in their entirety.

OBJECTS OF THE INVENTION

One object of the present invention is to describe a system, including methods and apparatus, for guiding proxy robots, robotic vehicles and the like, in computer-generated approximated real time (ART) to overcome the challenge of long communication path delay times.

A second object of the present invention is to describe a viable methodology for lunar exploration utilizing proxy robot surrogates on the moon controlled in approximated real time by humans on Earth.

A third object of the present invention is to describe a viable methodology for lunar exploration that provides video to a human handler that contains both proxy robot camera and computer-generated video streams such that the handler can see not only what the robot has seen 1.3 seconds before, but also the best possible approximation of what the robot will be seeing 1.3 seconds in the future, when the handler's directions reach the proxy robot.

A fourth object of the present invention is to describe a viable methodology for lunar exploration utilizing proxy robot surrogates on the Moon controlled by humans on Earth, including a video display that allows a human handler to control the movements of a proxy robot without dizziness, nausea or disorientation.

A fifth object of the present invention is to describe a viable methodology for lunar exploration utilizing proxy robot surrogates on the Moon controlled by humans on Earth, including a video display that allows the human handler to control the movements of a proxy robot in computer-approximated real time.

A sixth object of the present invention is further to object three, wherein the robot camera and computer-generated video streams are displayed side-by-side horizontally or one over the other vertically.

A seventh object of this invention is further to object three, wherein the computer-generated video stream is displayed inside of the robot camera stream, in picture-in-picture fashion.

An eighth object of this invention is to describe a viable methodology for space exploration utilizing proxy robot surrogates in space controlled in approximated real time by humans on Earth.

A ninth object of this invention is to describe a viable methodology for space exploration utilizing proxy robot surrogates on Mars or elsewhere in space controlled by humans on Earth, including a video display that allows the human handler to control the movements of a proxy robot in computer-approximated real time.

A tenth object of this invention is to describe a viable methodology for space exploration utilizing robots and robotic vehicles in space controlled by humans on Earth, including an approximated real time (ART) video display that allows the human handler to control the movements of each robot or robotic vehicle.

An eleventh object of this invention is to describe a viable methodology for the exploration of Mars and other destinations in space utilizing proxy robot surrogates at the remote site controlled by human handlers on Earth utilizing approximated real time video and terrain simulation to replicate the robot's position and circumstances at the moment the control signals arrive at the destination in space.

A twelfth object of the present invention is the establishment of a surveillance grid through the provision of a plurality of pole cameras which can be dropped onto a body in space from an orbiting spacecraft, satellite, or a balloon or other aircraft.

A thirteenth object of this invention is the establishment of a high resolution position mapping grid through the provision of a plurality of radio beacons or RFID transponders to communicate with and thereby determine with high accuracy the location of proxy robots and robotic vehicles in the mission area.

A fourteenth object of this invention is the provision of at least one high resolution, far-field camera attached to each proxy robot for duty in missions with long communication path delay, the purpose of which is to continuously gather and transmit video images of areas where the proxy robot is likely to be in the time it takes for signals to reach the Earth and data to return from mission control.

A fifteenth object of this invention as object fourteen, wherein at least two far-field cameras are mounted in the head of the proxy robot directly above its near-vision 3D cameras.

A sixteenth object of this invention as object fourteen, wherein at least one far-field camera views 360-degrees of terrain at high resolution, providing mission specialists and the computer generating approximated real-time video vital information about the terrain ahead regardless of the proxy or other robot's direction of travel.

A seventeenth object of this invention as object fourteen, wherein the video transmitted to Earth by each far-field camera is of sufficiently wide viewing angle and sufficiently high resolution as to permit electronic pan, tilt and zoom functions without substantially degrading video quality.

An eighteenth object of this invention is to describe a viable methodology for space exploration utilizing robots and robotic vehicles in space controlled by humans on Earth, including a terrain analysis computer which generates an approximated real time video display that allows the human handler to control the movements of each robot or robotic vehicle, as well as data streams representing "terrain just ahead", handler heading, handler step distance, and handler step moment which are bundled and fed to circuitry that turns input into meaningful signals to controlling the roll, pitch and yaw of art environment simulator from which a human handler controls every move of a remote proxy robot.

SUMMARY OF THE INVENTION

A system and method for guidance of a moving robotic device through an approximated real time (ART) virtual video stream is presented. The system and method includes at least one camera for collecting images of a terrain in a remote location, at least one terrain data collecting device for collecting data from a remote location, a memory for storing images from the plurality of cameras, a communication device for transmitting the images and data over a path and a computer configured to calculate a delay between the cameras and the receiver. The calculated delay causes the computer to retrieve images and data from the receiver and memory and consequently generate an approximate real-time video and data stream for displaying the terrain-just-ahead of a moving robotic device at a distance proportional to the calculated delay and the ART video and data stream is used to guide the moving robotic device.

DESCRIPTION OF THE DRAWINGS

FIG. 1 depicts a proxy robot on the surface of the Moon under the control of a human handler on Earth;

FIGS. 2A-2E illustrate how an exemplary ART video stream can be displayed in useful fashion for the handler;

FIG. 2A is an illustration of an exemplary proxy robot in three positions;

FIG. 2B is an illustration of an exemplary square portion that has been cut from the center of video stream;

FIG. 2C is an illustration of an exemplary approximated real time video stream;

FIG. 2D is an illustration of an exemplary display screen for human handlers guiding proxy robots on the Moon;

FIG. 2E is an illustration of an exemplary of a method of displaying;

FIG. 2F is an illustration of an exemplary of a top screen containing the delayed video from the proxy robot and a bottom screen displaying ART video from a computer;

FIG. 3 illustrates the application of real time approximation to projects with a long communication lag, the prime example being the robotic exploration of Mars via Earth-bound control personnel;

FIG. 3A is an illustration of exemplary mapping and measurement operations;

FIG. 4 illustrates the scenario of FIG. 3 with one or more observation satellites continuously viewing a large area;

FIG. 5 illustrates the use of real time approximation for non-proxy robotic missions;

FIG. 6A illustrates capturing terrain close at hand with a camera;

FIG. 6B illustrates a view of what the robot would see; and

FIG. 6C illustrates a view processed to sharpen the apparent focus of the camera.

DETAILED DESCRIPTION OF THE INVENTION

Figure 6A:
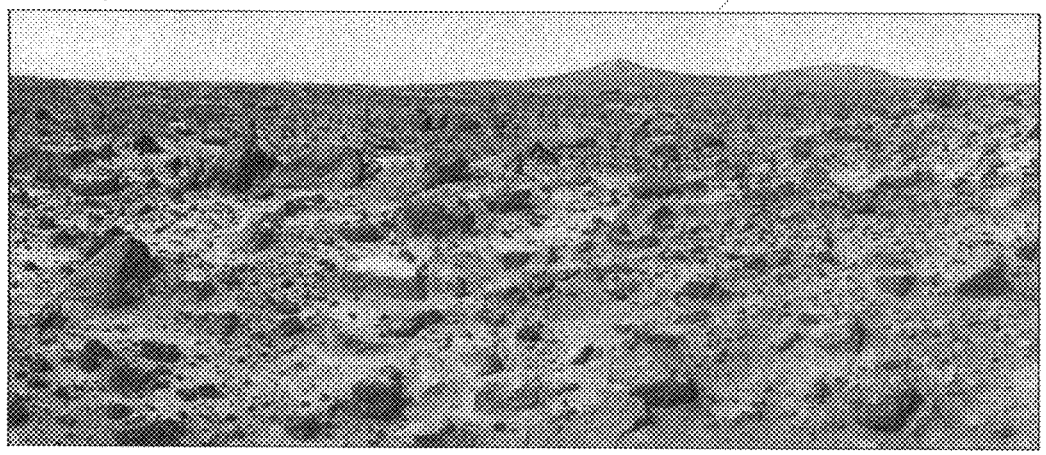
FIGS. 6A-6C illustrate the merits of employing high resolution, far-field cameras.

FIG. 1 depicts an exemplary proxy robot 1 in accordance with embodiments of the present invention on the surface of the Moon under the control of a human handler 26 on Earth. The proxy robot has two camera "eyes" 2 and 3, that focus on an area 4 that the robot is directed to face, streaming live video to a video and terrain sensor data aggregator 15 and Earth-Moon communication means 23. The proxy robot may also contain other terrain sensors such as sensor 5 located in the center of the robot's head above the camera eyes. Sensor 5 scans a region 6 and may contain laser, radar or other ranging or mapping means. Terrain-just-ahead sensors 7 may also be located in the front of each of the robot's boots to map and warn of uneven terrain, rocks, pits and so forth that might hinder forward movement.

The general mission area may contain other proxy robots 8 which may also be directed to scan the terrain ahead of proxy robot 1, via video 9 and ranging/mapping means 10. In the drawing, the ranging/mapping area of scan is higher (usually denoting further distance) than the video camera field of view.

Since FIG. 1 illustrates a proxy robotic mission, and since proxy robots are under total human control and can generally do anything humans can do, it is not at all unreasonable to envision the proxy robots erecting one or more pole-mounted video cameras 11 in the mission area to observe a particular region 12. Such pole-mounted cameras may be on telescoping poles and may be portable, capable of being moved to whatever staging area is of current interest to the mission. Moreover, cameras like 12 may also have the ability to zoom, pan and tilt, allowing mission personnel to focus on some particular region or feature of interest, including terrain immediately ahead of a walking proxy robot.

Above the mission area, one or more satellites 13 watch a much larger arc 14. Satellites may be in geosynchronous or other orbits, but at least one "eye in the sky" should always focus on each active mission area.

FIG. 1 depicts a number of video and terrain data sources, each capable of observing the area ahead of proxy robot 1. All of their resulting video and data streams 16 are combined in video and terrain sensor data aggregator 15 and thereafter routed to Moon-Earth communication means 23. This bundled video and terrain data travels over a 238,900 mile path 24 between Moon and Earth, where it is received by a video and data receiver 29. Data traveling this distance at the speed of light (186,000 miles/sec) will arrive at the earth delayed by approximately 1.3 seconds (238,900/186,000), not taking into account electronic or retransmission delay times.

So if a handler makes a move, she won't receive video confirmation from her proxy for 2.6 seconds, round trip communication time between Earth and Moon. This video lag can cause dizziness and disorientation, and could well disrupt a proxy robotic mission to the moon if not compensated. The creation of an approximated real time (ART) virtual video stream for the handler can overcome this video lag problem.

At the Earth base side of communication path 24, "live" but delayed video 17 is routed to one or more display devices (for example, screen 40 in FIG. 2E) to give the handler and other mission personnel a robot-eye view. In addition, all of the aggregated video and data streams 18 from the lunar mission are routed, together with "ping" data to be described below, into a terrain analysis computer 19. From all the streaming video and data, plus data including video and still photos of the region already stored in memory 20, terrain analysis computer 19 is able to create video, positional and other data mapping of the area just ahead of the proxy robot, producing 112 vital terrain-just-ahead data 22 for the proxy's handler and 111 a mission-critical ART video stream 21, some 1.3 seconds into the future of the robot's actual position and 2.6 seconds ahead of the robot's delayed video 17. ART video stream 21 will normally be a virtual video view generated 111 by the terrain analysis computer 19, anticipating what the camera "eyes" of proxy robot 1 will view 1.3 seconds into the future.

Terrain-just-ahead data 22 and ART video 21 are sent to the display 114 of handler 26. The received video and data may cause the handler to take further action, for example, taking another step forward. The "follow me" data 28 representing this action is routed to the lunar mission site via path 24a and to the proxy robot 1 who carries out the movement. In the meantime, a sample of the same "follow me" data 25 is routed back to the terrain analysis computer 19 to allow ART video and terrain-just-ahead data to compensate for the latest handler moves. Thus there is a dynamic feedback loop 27 at all times between handler 26 and terrain analysis computer 19, allowing the handler to move virtually in real time though the computer-generated landscape.

The "follow me" transmissions from handler to proxy can also serve another purpose, which is to accurately calculate round-trip delay from the Earth base to the Moon and back, including path delay in space; path delay on Earth (for example, in relaying signals from distant satellites and tracking stations to the base); and electronic delay through all the pickup, relay and processing equipment. Such calculation can be precisely achieved in several ways:

1) Outgoing "follow me" signals 28 can be time-coded with embedded signals, and this timing information can be compared to the time the signals make an entire round-trip through space and all electronic systems.

2) A "ping" can be sent at regular intervals with "follow me" signals and the time of it's round-trip return accurately noted. Such pinging might be especially important in cases where the distance between home base and remote base is constantly changing, as in the case of the Earth and Mars (FIG. 3) or the Earth and any other body in space apart from the Moon.

In either case, time-stamp ping data of this sort can accompany "follow me" data from handler to proxy, in a bundle 28 that includes ping time-stamp 34. At the Earth side of path 24a, the bundled data is fed into Earth-Moon communications means 30; on the Moon side of the path, a receiver 31 receives and decodes the signals in this bundle, routing "follow me" data 32 to the proxy robot and "ping" data 33 back to Earth via communications means 23. When the remote base data (from the Moon in the present case) is received by video and data receiver 29, the signals 18 sent to terrain analysis computer 19 will include time-stamped round-trip ping signals from which the computer can calculate 110 not only the total round-trip signal delay, but also the delay on the Earth-Moon leg, allowing it to precisely render ART video pertaining to that amount of time in the future.

For example, a ping time-stamped 09:22:43.77 (09:22 and 43.77 seconds) on Earth might accumulate 0.3 seconds pre-path; 1.30 seconds Earth-to-Moon; 0.08 seconds in Moon electronics; 1.3 seconds Moon-to-Earth, 0.42 seconds in satellite and other electronic relay means to Earth Base, and 0.1 seconds in electronics at Earth Base, bringing the total round-trip delay to 3.5 rather than 2.6 seconds. Time-stamped Moon data would show a Moon-to-Earth delay of 1.82 seconds in the example; subtracting this 1.82 seconds from the 3.50 total would yield an Earth-to-Moon delay time of 1.68 seconds: exactly the time difference for the terrain analysis computer and its ART video generator to anticipate. In long time delay scenarios such as Earth-Mars (see FIG. 3), the terrain analysis computer may have to interpolate path delay in situations where the distance between bodies is rapidly shifting. Pinging and interpolation may be even more important in missions dealing with multiple variables: for example, on one of the moons of Jupiter (where distance and consequent path delay will vary not only with the movements of Earth and Jupiter in their respective orbits, but also as the moon circles Jupiter).

FIG. 2 explores ways that the ART video stream can be displayed in useful fashion for the handler. FIG. 2A shows a proxy robot in three positions 100, 101 and 103 (A, B and C). Position B depicts real time (RT), while position A is 1.3 seconds in the robot's past (RT−1.3 sec) and position C is 1.3 seconds into the robot's future (RT+1.3 sec). Above each position is a rendering of the robot's view: panel 17a shows a big rock and some horizon, while panel 102 represents a step closer to the rock, and panel 104 is another step closer still.

Video stream 17a represents the video 17 delayed 1.3 seconds by the Moon-Earth path 24 in FIG. 1. Video stream 102 is what the robot is seeing in real time, and what mission personnel on Earth will see in 1.3 seconds, while video stream 104 is a robot-eye view 1.3 seconds into the future. Of immediate interest to this discussion are streams 17a and 104, since it is these 2 streams that will be displayed together in some manner.

In panel 17b of FIG. 2B, a square portion has been cut from the center of video stream 17a, while the larger panel in FIG. 2C represents the approximated real time video stream 21c from terrain analysis computer/ART video generator 105 (compare it with panel 104 above). From this computer-generated video feed we can take the smaller center portion 106, which matches exactly the "hole" in panel 17*b*.

Combining these two video feeds yields the panel in FIG. 2D, one embodiment of a display screen in which proxy robots on the Moon receive guidance from human handlers. In the center of this panel, within the corner markers and dotted lines, is the middle portion of ART video stream 21*d*, a computer-generated video representation 2.6 seconds into the future of the proxy robot (position C in FIG. 2A above). This center portion of the screen guides the handler's every move and maintains the handler free of dizziness and disorientation, while the larger outer portion 107 tracks 1.3 second delayed video back from the robot in position A of FIG. 2A.

FIG. 2E depicts another method of displaying 1.3 second (delayed) video 17*e* and +1.3 second ART video 21*e* in side-by-side panels 40 and 41. In this case, the handler guides the robot from the ART video screen 41, keeping her eye on the delayed video screen 40 as the mission progresses. In FIG. 2F, top screen 42 contains the delayed video from the proxy robot, while bottom screen 43 displays ART video from the computer. In the case of both FIGS. 2E and 2F, ART video is full-screen as opposed to a smaller portion inserted into the center of a single screen (FIG. 2D).

FIG. 3 illustrates the application of real time approximation to projects with a long communication lag, the prime example being the robotic exploration of Mars via Earth-bound control personnel. Communication time each way to and from Mars varies between 3 and 22 minutes, depending on the relative positions of Earth and Mars in their orbits. Previous robotic missions to Mars have proceeded rather slowly and inefficiently as commands are sent from Earth, arrive at Mars 5-10 minutes or more later, and are finally carried out by the robot as verified by signals taking another 5-10 minutes or more to reach Earth.

The key to applying real-time approximation and streaming ART video to such missions is good reconnaissance, preferably well in advance of each robotic mission. Thus it would be a very good idea to have one or more satellites 45 orbiting over the mission site and gathering information 46 about each and every hill, valley, crater and rock in the area. In an alternate embodiment, at least three satellites 45, 45*a* and 45*b* not only gather reconnaissance data but also form part of a global positioning satellite (GPS) network over the area being surveyed. While having such a GPS network in place over an actual mission can help assure that the location of a proxy robot or robotic vehicle on Mars is where its human handler on Earth intends it to be, satellites like these are unlikely to have sufficient resolution to focus on small things on the ground or to precisely direct the steps or movements of a proxy robot or robotic vehicle. Consequently, an important part of the present invention is the use of a much higher resolution local positioning system in conjunction with the more generalized view of a GPS satellite network.

In point of fact, satellites 45*a* and 45*b* may even represent historic (non-current) GPS mapping, although satellite 45 directly over the mission is still desirable to provide critical communication and general positioning functions. Described below are various cameras and other means of obtaining high resolution images of the area surrounding a given proxy robot or robotic vehicle, necessary to the achievement of a local positioning system to work in tandem with already-established but more general and imprecise GPS measurements.

FIG. 3A is an illustration of such mapping and measurement: a small quadrant of Mars, screen-captured from Google Earth in Mars mode. The area in question 129 is from a camera eye view of 10,000 feet, at the limits of the resolution of the satellite. It measures approximately 3 Km east-west by 1.5 Km north-south, with about 2.5 Km separating the craters labeled A (121) and C. (123). The crater 122 marked B has a diameter of approximately 81 meters (5 seconds of longitude, with each second representing some 16.2 meters). The 10 meter resolution of this surveyed area of Mars is typical, with some regions slightly better and many considerably worse. Resolving a 10 meter area is sufficient for general GPS mapping of a planet like Mars, but still only about 1/100 of the resolution needed to direct a robot to pick up a rock or avoid a small obstacle.

Since the utilization of cameras and other means (below) at the mission site generates video, photos and data with the required resolution and more, a local positioning system tied to more general GPS mapping can serve as the local reference for the guidance of proxy and other robots. Crosshair points A, B and C in the section map of FIG. 3A illustrate how the mission can utilize landmarks such as the rough centers of craters, then extract the coordinates of each. For example, point A (121) measures 39 degrees, 56 minutes and 4.71 seconds north latitude by 86 degrees, 37' and 49.80" west longitude, while point B (122) comes in at 39 degrees, 54' and 43.15' N by 86 degrees, 35' 58.63" W. High resolution images of the entire mission area 124 can be overlayed by the terrain analysis computer on this rough GPS framework, and from the results a very precise local GPS-like positioning system can be constructed and utilized by the terrain analysis computer in generating ART video and data for human handlers and/or robotic vehicle operators.

Under this new framework, point A coordinates might end in 4.7100 seconds north and 49.8000 seconds west, and a very precise local position can be triangulated for some location D (125) representing the target robot in the mission staging area. Such local positional data can accompany each "follow me" instruction from a human handler to her proxy robot, or each command from the operator at mission control to his robotic device on Mars or elsewhere in space—locational data precise to inches or centimeters at the mission site. In cases where GPS mapping already exists but there is no active GPS satellite system in orbit around the planet, features like the three craters from the existing coordinates can be used to calibrate a much more defined, local GPS-style reference system as outlined. On the other hand, if an active satellite GPS system is in place over the mission area, ground cameras, radio beacons and transponders can act in concert to illuminate and refine the resolution of the existing GPS maps.

It is this local positional frame of reference and not the more general GPS data that drives each robotic mission. For example, a human handler takes a step and moves to local coordinates 39d 55m 29.3778s N×86d 36m 11.0187s W and relays this information to a proxy robot—a position accurate to 16 millimeters on the surface of Mars. As the robot emulates the handler's step, it checks against local triangulation means such as radio beacons or "pinged" RFID chips placed at locations 126, 127, 128, 129 and 130 around the perimeter of the mission site, then makes any correctional movements to be at that exact position.

FIG. 3 depicts a proxy robot 47 on the surface of Mars under the control of a human handler 40 on Earth. The proxy robot has two sets of camera "eyes": a lower set 54R and 54L that focus on an area 48 immediately in front of the robot, and a higher set 44R and 44L that looks far ahead to where the robot is apt to be twenty minutes or so into the future. The near-field set of cameras 54R and 54L stream video to a display screen in Mission Control, allowing personnel there to watch what was live video ten minutes or so earlier, depending on the actual path delay at that time.

The upper (far-field) set of cameras 44R and 44L have wide angle lenses and pick up a high resolution view of the entire area ahead. The object of the far-field, high-resolution cameras is to provide video of a region that is likely to include the area that will be traversed by the proxy robot twenty minutes in the future—or whatever timeline represented by round-trip communication between Earth and Mars or some other point in space at that particular juncture (c.f. FIG. 6). In this manner, a good quality video stream can be culled from the broad view by electronic selection (zoom, pan, tilt) to yield what is in effect a real-time view of the robot's future position.

In place of or in addition to the upper far-field cameras, a 360-degree camera system 35 can be mounted atop the head of a proxy robot like robot 47. Achieving fully circular coverage is possible in many ways, one of which is through the use of four individual cameras. These are represented via arrows 36-39 in the expanded view of the 360-degree camera 35a. Another possibility is for camera 35 to scan a full 360 degrees by rotating either the camera itself or via the rotation of a lens and prism or mirror system. Still another way to achieve a 360-degree view from a single camera is for that camera to point either up or down into a spherical mirror that captures the entire panorama.

The advantages of such an "all-seeing" camera system are numerous, but probably the most important is that the resultant video would essentially allow human handlers, mission specialists and their terrain analysis computer an accurate view of any space likely to be in the ten- or twenty-minute future of its proxy robot host. Within the housing of camera 35 can also be placed a GPS transponder to allow triangulation satellites 45, 45a and 45b or other means as explained above to continuously track the position of each proxy robot and compare that position with the position being transmitted by the robot's handler as that handler moves through the simulated environment, As each step of the proxy robot should coincide with the position being transmitted by the handler, the robot must compensate for any difference by varying the distance and direction of that step as necessary.

Since FIG. 3 illustrates a proxy robotic mission, and since proxy robots are under total human control and can generally do anything humans can do, it is not at all unreasonable to envision the proxy robots erecting one or more pole-mounted video cameras 50 in the mission area to observe a particular region 51. Such pole-mounted cameras may be on telescoping poles and may be portable, capable of being moved to whatever staging area is of current interest to the mission. Moreover, cameras such as "buoy cam" 68 may be strategically dropped into the area of interest, returning their own video stream 69.

Pole cameras like 12 and 68 may also have the ability to zoom, pan and tilt, allowing mission personnel to focus on some particular region or feature of interest, including terrain immediately ahead of a walking proxy robot, and may also contain radio beacons, RFID transponders or other means to assist in high resolution local position mapping.

Above the mission area, one or more satellites 45, 45a and 45b observe a much larger arc 46. Satellites may be in synchronous or other orbits, but at least one "eye in the sky" should always focus on each active mission area and be able to relay high resolution images of the terrain ahead of any given proxy robot, while three or more satellites triangulate each proxy's position. However, if previous GPS-style mapping is already in place, other camera means (below) may be employed to provide current high resolution images of the mission area, coordinated with the previous GPS positional data. If an active mission area is under surveillance, local triangulation can serve to identify a robot's position for ART video and data generation by the terrain analysis computer 61 back on Earth as opposed to broader but lower resolution images from satellite observation platforms. It is this local, high-resolution triangulation data that will guide each mission and coordinate each step of the proxy robot with the transmitted position of its human handler in that handler's ART simulated environment.

FIG. 3 is concerned with the exploration of Mars and other planets utilizing proxy robots 47, 52. At the onset of a new mission, proxy robots can erect pole cameras like camera 50 to survey the mission area 51. On planets like Mars that have some atmosphere (albeit only $\frac{1}{150}$ that of earth), the proxy robots might launch one or more balloon cameras 55 to monitor the mission area 56. The thin atmosphere must be taken into account in launching a camera and transmitter payload mounted on a tethered balloon, but on Mars the balloon needn't be 150 times larger than its counterpart on Earth, for the simple reason that Mars gravity is only 38% that of Earth.

So a given payload needs a balloon 150×0.38=57 times the volume of its earth counterpart. But since microelectronics renders payload size and weight extremely small, a balloon of quite reasonable size can be used for surveillance and local position triangulation purposes.

FIG. 3 depicts a number of video and terrain data sources, each capable of observing the area ahead of proxy robot 47. All video and sensor data sources are aggregated and sent to a communication means 57 which relays them over the path 58 from Mars to Earth, a process taking between 3 and 22 minutes each way depending on the relative positions of each planet in their orbits.

Delayed video 59 from proxy robot 47 goes to one or more display screens 60 in the mission control area, but the prime display screen 65 of interest to the proxy's handler features computer-generated ART video 64, created by terrain analysis computer 61 from the various video sources 66 at the remote mission site as well as data already stored in the computer. In addition to producing the approximated real time (ART) video stream for the handler 40, the computer generates a stream of terrain-just-ahead data 63 to give the handler the best indication possible of how to move the proxy robot. ART video stream 64 will normally be a virtual video view generated by the terrain analysis computer 61, anticipating what the camera "eyes" of proxy robot 47 will view 10 minutes into the future (or whatever time it takes for signals to travel from Earth to Mars or another remote destination). However, it might also be possible for computer 61 to edit video from the far-field camera(s) in such wise as to generate this "future view" seen by human handler 40.

As the terrain analysis computer generates the ART video stream that maintains the human handler visually informed about each step and movement in the far-distant terrain of Mars or another remote site, the same computer also correlates the position of that handler's proxy robot or vehicle by generating a stream of high resolution, localized GPS location data from the mission site. While general GPS data can originate from a network of at least three satellites over the site or come from triangulation and mapping data on record and immediately accessible to the computer, the high resolution, localized GPS stream will be generated by the terrain analysis computer by coordinating features in the mission site with the general GPS positional data. This high resolution, localized GPS positional data will guide each robot's every move by accompanying the "follow me" commands transmitted from handler to robot, allowing the remote proxy or vehicle to continually update and correct its position as it steps, rolls or otherwise moves along. If for any reason the proxy or robotic vehicle finds itself unable to move as commanded or make necessary position corrections, it can be programmed to stop, notify mission control, and await corrective action once that notification reaches Earth and the situation has been assessed and addressed by mission personnel.

The proxy robot 47 receives "follow me" data 41 from a handler over Earth-Mars communication path 58a. If it takes 10 minutes for the signals from Mars to Earth and another 10 minutes back to Mars, delayed video on screen 60 will be 10 minutes old, while the ART video on screen 65 will be 10 minutes in the future (and 20 minutes later than delayed video 60). A sample of the handler's "follow me" data 67 will also be routed back to the terrain analysis computer, setting up a dynamic feedback loop 42 that allows virtually instantaneous correction for new headings and other moves by the handler.

In addition to a proxy robot or robotic vehicle at some distant mission site in space and a human handler to control every movement of that robot, four things must be present to assure the mission's successful and productive outcome. These include 1) high resolution cameras and data sources at the mission site to provide high quality video, images and positional data; 2) precise time-stamping over a shared time standard reference so that the exact time lag is always known between the base and its robotic mission site in space; 3) equally precise position mapping means, shared between Earth and mission sites; and 4) a terrain analysis computer to generate accurate ART video for the handler, send and receive time-stamp data, oversee and constantly update local position mapping and put everything together to keep the mission operating in real time.

FIG. 4 depicts the scenario of FIG. 3 in another way, with three or more observation satellites 70, 70a and 70b continuously viewing a large area 71 where the Mars mission is taking place while monitoring the exact positions of each proxy robot in GPS fashion. Proxy robot 72 is shown in three positions in time: position B is the proxy's real time on Mars, while position A is ten minutes past and position C is ten minutes into the future. The video view 73 from position A travels over path Ma where it arrives after ten minutes 85 to be displayed on screen 86.

Video and data from other monitoring means, including video stream 75 from pole camera 74, stream 77 from balloon 76, and stream 78 from a far-field camera system included in proxy robot 72, are bundled together 87 with the proxy's video and data streams 73, 78 by video and terrain sensor data aggregator and communication means 88, where they are transmitted over path 84b, arriving ten minutes later 89 at the terrain analysis computer 90.

By the time the video and data 89 have arrived on Earth, proxy robot 72 is many steps ahead in position B. The proxy's video and data output 81 is now entering path 84b along with video and data from the other monitoring sources at the remote mission site, to arrive at the earth mission base in another ten minutes.

But terrain analysis computer 90 is already generating video and terrain data ten minutes into the future of the proxy's real time position (B); ART video 92 from the computer is now in future position C, verified by far-field video 78 monitoring future position 72c and just arriving at Earth Base. The human handler of proxy robot 72 is watching screen 93, such that ART video guides the handler and the handler guides 94 the proxy robot, with "follow me" instructions arriving at RT+10 minutes, in proxy robot 72 position C.

In FIG. 5, the mission site and robotic positions duplicate those of FIG. 4, with one major exception: FIG. 5 illustrates the use of real time approximation for non-proxy robotic missions where the robots take the form of rovers (depicted) or other non-humanoid robotic configurations. The need for monitoring 201 by satellites 200, 200a and 200b is even more important here, since non-proxy robots cannot easily erect tower cameras or launch observation balloons. Deploying a GPS network of at least three widely-separated satellites like 200, 200a and 200b is key to mission efficiency, productivity and ultimate success if operations can proceed from Earth to Mars in approximated real time. Such GPS mapping need not be current, however, since other camera means like far-field camera 204 (below) may be employed to provide current high resolution images of the mission area, coordinated with the previous GPS positional data. If an active mission area is under surveillance, local triangulation can serve to identify a robot's position for ART video and data generation by the terrain analysis computer 216 back on Earth as opposed to broader but lower resolution images from satellite observation platforms.

Positions A, B and C are the same as in FIG. 4 above, but they are occupied by a robotic vehicle 202. Position A is ten minutes in the past, generating video stream 211 from viewpoint 203 which travels over path 210a to earth, arriving ten minutes later and routed to display screen 212. A far-field camera 204a is mounted higher on the pole on robotic vehicle 202a. The purpose of the far-field camera is to peer 205a at terrain likely to include the vehicle's position some twenty minutes into the future (i.e., position C in the drawing), compensating for a round-trip path delay of 10 minutes each way (c.f., FIG. 6). On Mars, this future calculation might be as great as forty-four minutes or as little as six minutes round trip, depending on the positions of Mars and Earth relative to each other.

The far-field camera 204a-c will have extremely high resolution over a wide angle of observation, or may actually comprise a plurality of cameras with their video stitched together to cover an entire 360-degree arc around the robotic vehicle. Another possibility is for far-field camera 204a-c to scan a full 360 degrees by rotating either the camera itself, via the rotation of a lens and prism or mirror, or looking up or down into a 360-degree spherical mirror. The above discussion applies to all positions of the robotic vehicle, including positions B and C below.

In real time, the robotic rover is now in position B, scanning area 207 and far-field view 205b. Video and data from robots, satellites and other sources are bundled together 213 and sent to Earth by video and terrain sensor data and aggregator and communication means 214, to travel over path 210b to Earth. The terrain analysis computer 216 receives this video and data 215 and accesses stored data 217 as well to generate the ART video 218 displayed on screen 219 for the controllers of rover 202.

Controller commands 220 to rover 202 uplink over path 221 to arrive at RT+10 minutes, when the rover is at position C. The application of real time approximation to robotic missions of all types renders a mission to Mars or some other distant place far more efficient of both time and human resources than the typical method of issuing commands and waiting for results in fits and starts.

Figure 6B:
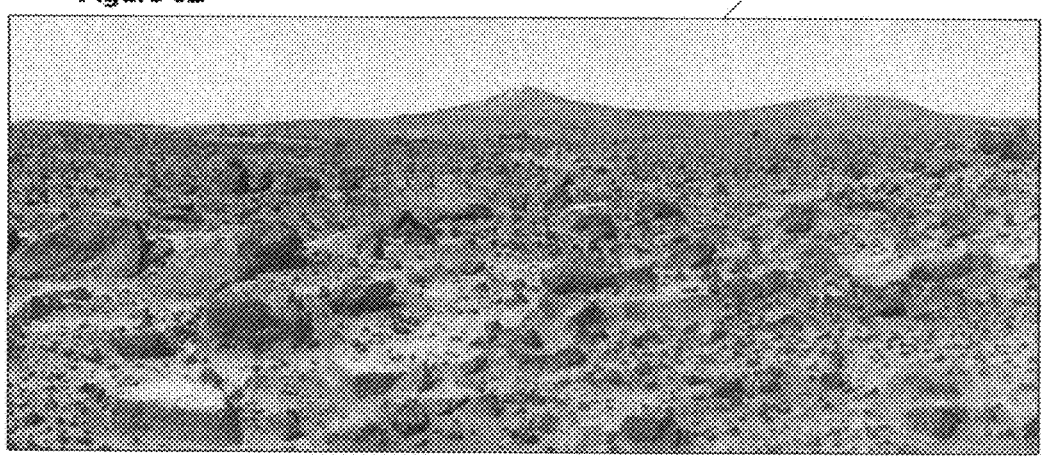
Figure 6C:
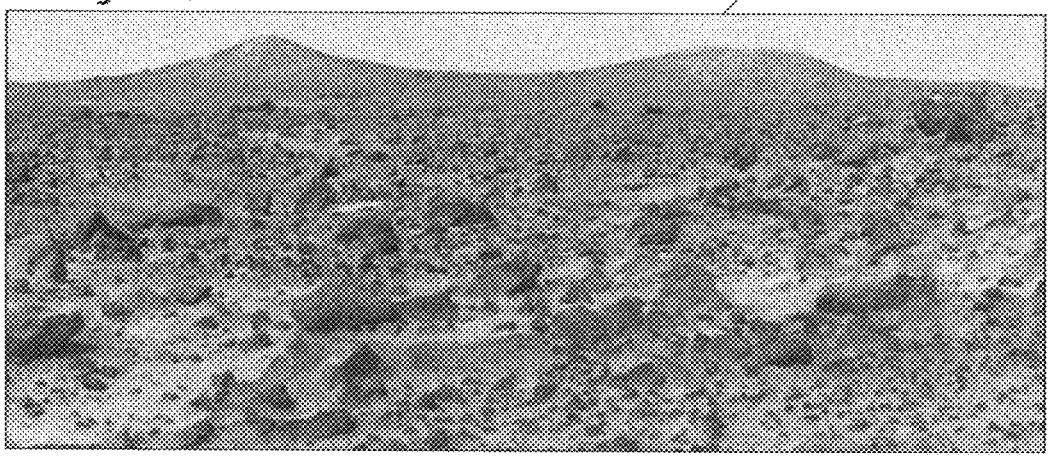

FIGS. 6A-6C demonstrate the merits of employing high resolution, far-field cameras like those described under FIGS. 3 (44 and 35), FIG. 5 (204), and in particular, FIG. 4, viewing angle 78; the latter showing a portion of the "twin peaks" photo utilized for FIGS. 6A-6C.

Compare video screen 86 in FIG. 4 to FIG. 6A, and it should be obvious that screen 86 comprises a portion of 6A, which captures terrain close at hand while showing two small peaks in the distance. If a proxy robot were to walk ten minutes toward the peaks, the robot would electronically "see" screen 6B, much closer to the twin peaks. Another ten minutes in the same direction would yield screen 6C. Note how close the peaks are in this view.

What is far less obvious, however, is that all three screens (6A, 6B and 6C) were taken from one single photographic view, covering much more terrain than any of the three screens. The original photo was taken by NASA/JPL's Mars Pathfinder mission: http://marsljpl.nasa.gov/MPF/parker/TwnPks_RkGdn_left_high.jpg and each of the three screenshots is simply an electronically zoomed portion of the former. The pixels in FIG. 6C, however, have been processed to sharpen apparent focus.

This high resolution view of the Martian landscape provides ample testimony to the worth of including one or more high resolution, wide angle video cameras with each proxy robot or robotic vehicle being sent to Mars or some similar destination in space, since the video can render a view of the robot's future extremely useful to the terrain analysis computer as it renders the most accurate virtual view possible of that same future.

I claim:

1. A system at a terrestrial location of a human handler for guidance of a proxy robot surrogate robotic device at a remote extraterrestrial location utilizing a computer-generated approximated real time (ART) video landscape, the system comprising:
    a local positioning means at the remote extraterrestrial location to continuously determine the position of the proxy robot surrogate in the remote extraterrestrial location,
        wherein the local positioning means is configured to cause the proxy robot surrogate to correct its position to conform with location data accompanying a follow-me data stream originating from the position of the human handler;
    at least one receiver for receiving far-field video images from at least one camera at the remote extraterrestrial location and data from at least one data collecting device at the remote extraterrestrial location;
    at least one terrain analysis computer configured to calculate a delay between the at least one camera and the at least one receiver,
        wherein the calculated delay causes the at least one terrain analysis computer to render the far-field video images and the data acquired from the remote extraterrestrial location to produce the computer-generated ART video and data displaying terrain-just ahead of a moving proxy robot surrogate at a distance proportional to the calculated delay, and
    wherein each movement of the human handler in the computer-generated ART video landscape is emulated by the proxy robot surrogate.

2. The system of claim 1, wherein the data includes terrain data, image data and positioning data.

3. The system of claim 1, wherein the ART video landscape and data is viewable by the human handler remote from the proxy robot surrogate.

4. The system of claim 3, wherein the proxy robot surrogate is configured to receive control signals for guidance based on the coordinates and movements of the human handler in a computer-generated landscape of the ART video and data stream.

5. The system of claim 4, wherein the control signals further comprise follow-me commands emulating the human handler's movements based on the ART video and data stream.

6. The system of claim 4, wherein the control signals further comprise precise positional data on coordinates of the proxy robot surrogate in the remote extraterrestrial location from the local positioning means.

7. The system of claim 5, wherein the follow-me commands are based on movements of the human handler and transmitted to the proxy robot surrogate, wherein the movements of the proxy robot surrogate mimic the movements of the human handler.

8. The system of claim 1, wherein the at least one camera further comprises at least one high resolution 360-degree far field camera mounted on the proxy robot surrogate.

9. The system of claim 8, wherein the at least one high resolution 360-degree far field camera includes a spherical mirror that captures an entire panorama around the proxy robot surrogate.

10. The system of claim 8, wherein the at least one high resolution 360-degree far field camera comprises a plurality of cameras, each focused on a segment of the panorama around the proxy robot.

11. The system of claim 2, wherein the positioning data comprises data from at least one satellite.

12. The system of claim 2, wherein the positioning data comprises triangulation data.

13. The system of claim 2, wherein the terrain data comprises topographical data.

14. The system of claim 1, wherein the local positioning means comprises cameras mounted on a pole, mounted on a tethered balloon, and mounted on a satellite.

15. A method for guiding from a terrestrial location of a human handler (terrestrial location) a moving proxy robot surrogate at a remote extraterrestrial location through the utilization of a computer-generated approximated real time (ART) video landscape comprising:
    inserting timestamps into far-field video images streaming from at least one camera on the moving proxy robot surrogate at the remote extraterrestrial location;
    sending the streaming far-field video images and timestamps to the terrestrial location;
    causing a terrain analysis computer at the terrestrial location to retrieve the timestamped streaming far-field video images;
    calculating a delay between the at least one camera streaming video from the remote extraterrestrial location of the moving proxy robot surrogate and the arrival of the streaming video at the terrestrial location based on the inserted timestamps;
    producing by the terrain analysis computer from the retrieved far-field video images a computer-generated ART video landscape displaying a perspective from a precise location to which the proxy robot surrogate is being guided, the proxy robot surrogate to arrive at that location at a time in the future proportional to the calculated delay;

sending a follow-me data stream representative of the movements and coordinates of a human handler moving through the computer-generated ART video landscape to the moving proxy robot surrogate at the extraterrestrial location;

enabling the moving proxy robot surrogate to continuously receive local coordinates of its position from a local positioning means at the extraterrestrial location and coordinates of the position of the human handler from the follow-me data stream; and enabling the moving proxy robot surrogate to continuously correct its position to conform with the coordinates of the human handler received from the follow-me data stream.

16. The method of claim 15, wherein the ART video is sent to at least one display viewable by the human handler in the computer-generated landscape, and wherein the moving proxy robot surrogate is configured to be guided by the follow-me data representing the movements of the human handler based on the ART video stream.

17. The system of claim 1, wherein the local positioning means comprises a plurality of radio frequency (RF) triangulation means including radio beacons and RF transponders.

18. The system of claim 1, wherein the local positioning means comprises a plurality of video cameras including pole cameras and buoy cameras on the ground and balloon cameras overhead.

19. The system of claims 4 and 6, wherein the proxy robot surrogate is configured to continuously compare the incoming follow-me coordinates of the human handler with its own coordinates from the local positioning means and modify its movements as necessary to conform to the coordinates of the human handler.

20. The system of claim 19, wherein the proxy robot surrogate corrects its position by varying the distance and direction of at least one step.

21. The system of claim 1, wherein the terrain analysis computer dynamically modifies the ART video stream in accordance with feedback from the follow-me data stream to instantaneously correct for position and heading changes by the user in the computer-generated landscape.

* * * * *